(12) United States Patent
Yu et al.

(10) Patent No.: US 10,075,254 B2
(45) Date of Patent: Sep. 11, 2018

(54) DATA SIGNAL COORDINATED TRANSMITTING AND RECEIVING METHODS AND APPARATUS

(71) Applicant: Huawei Technologies Co., Ltd., Shenzhen, Guangdong (CN)

(72) Inventors: Rongdao Yu, Shenzhen (CN); Sheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 221 days.

(21) Appl. No.: 14/692,891

(22) Filed: Apr. 22, 2015

(65) Prior Publication Data

US 2015/0229426 A1 Aug. 13, 2015

Related U.S. Application Data

(63) Continuation of application No. PCT/CN2013/074076, filed on Apr. 11, 2013.

(30) Foreign Application Priority Data

Oct. 23, 2012 (CN) .......................... 2012 1 0405982

(51) Int. Cl.
*H04J 11/00* (2006.01)
*H04B 7/02* (2018.01)
(Continued)

(52) U.S. Cl.
CPC .......... *H04J 11/0023* (2013.01); *H04B 7/026* (2013.01); *H04B 7/068* (2013.01);
(Continued)

(58) Field of Classification Search
CPC .. H04J 11/0023; H04W 72/0446; H04B 7/026
(Continued)

(56) References Cited

U.S. PATENT DOCUMENTS 6,173,005 B1 * 1/2001 Kotzin ................. H04B 7/0671
375/141
6,212,368 B1 * 4/2001 Ramesh ............... H04B 7/0808
455/132

(Continued)

FOREIGN PATENT DOCUMENTS

CN 1780180 A 5/2006
CN 102379107 A 3/2012

(Continued)

*Primary Examiner* — Rasheed Gidado

(57) ABSTRACT

A signal transmitting method includes: constructing data for first antenna and data for second antenna, where the data for first antenna comprises first transmission data that needs to be transmitted to a first device, transmission data that needs to be transmitted to a second device, and a parameter of a transmission channel from a second antenna to the first device; and using the first antenna and the second antenna to transmit the data for first antenna and the data for second antenna to the first device and the second device respectively, so that the first device cancels interference caused by the transmission data that needs to be transmitted to the second device in the data for first antenna and the data for second antenna, to the first transmission data and the second transmission data.

19 Claims, 7 Drawing Sheets

(51) Int. Cl.
*H04W 72/04* (2009.01)
*H04B 7/026* (2017.01)
*H04B 7/06* (2006.01)
*H04W 28/06* (2009.01)

(52) U.S. Cl.
CPC ...... *H04B 7/0613* (2013.01); *H04W 72/0446* (2013.01); *H04W 28/06* (2013.01)

(58) Field of Classification Search
USPC .................................. 370/252, 253, 310–350
See application file for complete search history.

(56) References Cited

U.S. PATENT DOCUMENTS

| | | | |
|---|---|---|---|
| 6,937,843 | B2 | 8/2005 | Foschini et al. |
| 8,953,699 | B2 * | 2/2015 | Sayana .................. H04B 7/024 370/252 |
| 2003/0104808 | A1 | 6/2003 | Foschini et al. |
| 2006/0109814 | A1 | 5/2006 | Kuzminskiy et al. |
| 2006/0120477 | A1 | 6/2006 | Shen et al. |
| 2008/0095087 | A1 | 4/2008 | Ahmavaara |
| 2009/0286486 | A1 * | 11/2009 | Hong ..................... H04B 7/061 455/69 |
| 2010/0268775 | A1 | 10/2010 | Doppler et al. |
| 2011/0135023 | A1 | 6/2011 | Kwon et al. |
| 2015/0049736 | A1 | 2/2015 | Liu et al. |
| 2015/0171944 | A1 * | 6/2015 | Kalhan ................ H04B 7/0413 370/329 |

FOREIGN PATENT DOCUMENTS

| | | |
|---|---|---|
| CN | 102439864 A | 5/2012 |
| CN | 103384161 A | 11/2013 |
| EP | 2 836 039 A1 | 2/2015 |
| RU | 2413392 C2 | 2/2011 |
| WO | WO 2010/084411 A1 | 7/2010 |
| WO | WO 2012/061993 A1 | 5/2012 |

* cited by examiner

DATA SIGNAL COORDINATED TRANSMITTING AND RECEIVING METHODS AND APPARATUS

CROSS-REFERENCE TO RELATED APPLICATION

This application is a continuation of International Application No. PCT/CN2013/074076, filed on Apr. 11, 2013, which claims priority to Chinese Patent Application No. 201210405982.3, filed on Oct. 23, 2012, both of which are hereby incorporated by reference in their entireties.

TECHNICAL FIELD

The present invention relates to the field of radio communications, and in particular, to a data signal coordinated transmitting and receiving method and apparatus.

BACKGROUND

An existing cellular mobile communication system (such as the third generation, 3G), and the fourth generation (4G) network) is a typical network with infrastructure, and uses multiple low-power transmitters (small coverage areas) in place of a high-power transmitter (large coverage area). Small coverage corresponding to each low-power transmitter is called a cell. A group of channels is allocated to each cell, and each cell uses a group of radio resources. Neighboring cells use different radio resources to prevent interference with each other. Cells that are faraway from each other may use the same radio resources repeatedly, which gives rise to spatial multiplexing of radio channel resources and improves system capacity significantly.

Existing device-to-device (Device-to-device, D2D) communication is a terminal self-organizing communication mode without requiring control exercised by a base station or an access node, which makes the communication or networking very flexible.

A D2D communication system introduced between terminals in the cellular mobile communication system brings a series of benefits, for example, 1) a nearby local service may be implemented through a relay between terminals in D2D communication instead of being implemented by the base station, thereby reducing occupation of base station resources; 2) coverage defects of an existing network can be overcome, and the problem of persistent coverage holes in the coverage area of the existing cellular mobile communication system can be eliminated; 3) power consumption can be reduced, and when communication is implemented by several short paths instead of one long path, the power sum of the several short paths is less than the power required by the one long path; and 4) the introduced self-organizing mode increases the capacity of the entire mobile communication system and increases spatial multiplexing.

Both cellular communication and D2D communication require transmission over limited spectrum resources. In the conventional mode, the spectrum resources required for cellular communication transmission are different from and independent of the spectrum resources required for D2D communication transmission, which avoids interference between the cellular communication transmission and the D2D communication transmission. However, because the cellular communication and the D2D communication occupy different spectrum resources, the spectrum utilization efficiency is reduced.

SUMMARY

A technical issue to be solved by embodiments of the present invention is to provide a signal transmitting and receiving method and device, which can superpose data directed to two terminals and then transmit the data, thereby enhancing system capacity and spectrum utilization efficiency.

In one aspect, an embodiment of the present invention provides a signal transmitting method, which is applied to a mobile terminal, where the mobile terminal includes a first antenna and a second antenna and the mobile terminal is communicatively connected to a first device and a second device respectively, the method including:

constructing data for first antenna and data for second antenna, where the data for first antenna comprises first transmission data that needs to be transmitted by the first antenna of the mobile terminal to the first device, transmission data that needs to be transmitted by the mobile terminal to the second device, and a parameter of a transmission channel from the second antenna of the mobile terminal to the first device, and the data for second antenna comprises second transmission data that needs to be transmitted by the second antenna of the mobile terminal to the first device, the transmission data that needs to be transmitted by the mobile terminal to the second device, and a parameter of a transmission channel from the first antenna of the mobile terminal to the first device;

using the first antenna to transmit the data for first antenna to the first device, and using the second antenna to transmit the data for second antenna to the first device, so that the first device cancels interference caused by the transmission data that needs to be transmitted to the second device in the data for first antenna and the data for second antenna, to the first transmission data and the second transmission data; and using the first antenna to transmit the data for first antenna to the second device, and using the second antenna to transmit the data for second antenna to the second device.

The data for first antenna includes data transmitted by the first antenna over one or more subcarriers, and data transmitted over each subcarrier in the data for first antenna comprises first transmission data that needs to be transmitted over the subcarrier to the first device, transmission data that needs to be transmitted over the subcarrier to the second device, and the parameter of the transmission channel from the second antenna to the first device; and the data for second antenna also includes data transmitted by the second antenna over subcarriers, and data transmitted over each subcarrier in the data for second antenna comprises second transmission data that needs to be transmitted over the subcarrier to the first device, transmission data that needs to be transmitted over the subcarrier to the second device, and the parameter of the transmission channel from the first antenna to the first device.

Alternatively, the data for first antenna includes data transmitted by the first antenna over one or more timeslots of a time domain, and data transmitted over each timeslot in the data for first antenna comprises first transmission data that needs to be transmitted over the timeslot to the first device, transmission data that needs to be transmitted over the timeslot to the second device, and the parameter of the transmission channel from the second antenna to the first device; and the data for second antenna includes data transmitted by the second antenna over one or more timeslots of a time domain, and data transmitted over each timeslot in the data for second antenna comprises second transmission data that needs to be transmitted over the timeslot to the first device, transmission data that needs to be transmitted over the timeslot to the second device, and the parameter of the transmission channel from the first antenna to the first device.

In another aspect, an embodiment of the present invention further provides a signal receiving method, including:

receiving, by a first device, data for first antenna and data for second antenna that are transmitted by a mobile terminal, where the data for first antenna comprises first transmission data that needs to be transmitted by the mobile terminal to a local receiver (receiving end or side), transmission data that needs to be transmitted to a second device, and a parameter of a transmission channel from a second antenna of the mobile terminal to the first device, and the data for second antenna comprises second transmission data that needs to be transmitted by the mobile terminal to the first device, the transmission data that needs to be transmitted to the second device, and a parameter of a transmission channel from a first antenna of the mobile terminal to the local receiver; and canceling, by the first device according to the received data for first antenna, the received data for second antenna, a preset parameter of the transmission channel from the first antenna to the first device, and a preset parameter of the transmission channel from the second antenna to the first device, interference caused by the transmission data that needs to be transmitted to the second device, to the first transmission data and the second transmission data, so as to obtain the first transmission data and the second transmission data.

In another aspect, an embodiment of the present invention further provides a signal receiving method, including:

receiving, by a second device, data for first antenna and data for second antenna that are transmitted by a mobile terminal, where the data for first antenna comprises first transmission data that needs to be transmitted by the mobile terminal to a first device, transmission data that needs to be transmitted to the second device, and a parameter of a transmission channel from a second antenna of the mobile terminal to the first device, and the data for second antenna comprises second transmission data that needs to be transmitted by the mobile terminal to the first device, the transmission data that needs to be transmitted to the second device, and a parameter of a transmission channel from a first antenna of the mobile terminal to the first device; and obtaining, by a receiver according to the received data for first antenna, the received data for second antenna, a preset parameter of a transmission channel from the mobile terminal to the second device, and a preset parameter of a transmission channel from the mobile terminal to the second device side, the transmission data that needs to be transmitted by the mobile terminal to the second device.

In another aspect, an embodiment of the present invention further provides a mobile terminal, where the mobile terminal includes a first antenna and a second antenna, the mobile terminal is communicatively connected to a first device and a second device respectively, and the mobile terminal further includes:

a data constructing module, configured to construct data for first antenna and data for second antenna, where the data for first antenna comprises first transmission data that needs to be transmitted by the first antenna of the mobile terminal to the first device, transmission data that needs to be transmitted by the mobile terminal to the second device, and a parameter of a transmission channel from the second antenna of the mobile terminal to the first device, and the data for second antenna comprises second transmission data that needs to be transmitted by the second antenna of the mobile terminal to the first device, the transmission data that needs to be transmitted by the mobile terminal to the second device, and a parameter of a transmission channel from the first antenna of the mobile terminal to the first device; and a data transmitting module, connected to the data constructing module, the first antenna, and the second antenna, and configured to: use the first antenna to transmit the data for first antenna to the first device, and use the second antenna to transmit the data for second antenna to the first device, so that the first device cancels interference caused by the transmission data that needs to be transmitted to the second device in the data for first antenna and the data for second antenna, to the first transmission data and the second transmission data; and use the first antenna to transmit the data for first antenna to the second device, and use the second antenna to transmit the data for second antenna to the second device.

In another aspect, an embodiment of the present invention further provides a base station, which is applied to a cellular transmission network and includes:

a first receiving module, configured to receive data for first antenna and data for second antenna that are transmitted by a mobile terminal, where the data for first antenna comprises first transmission data that needs to be transmitted by the mobile terminal to the base station, transmission data that needs to be transmitted to a second device, and a parameter of a transmission channel from a second antenna of the mobile terminal to the base station, and the data for second antenna comprises second transmission data that needs to be transmitted by the mobile terminal to the base station, the transmission data that needs to be transmitted to the second device, and a parameter of a transmission channel from a first antenna of the mobile terminal to the base station; and a first obtaining module, configured to cancel, according to the received data for first antenna, the received data for second antenna, a preset parameter of the transmission channel from the first antenna to the base station, and a preset parameter of the transmission channel from the second antenna to the base station, interference caused by the transmission data that needs to be transmitted to the second device, to the first transmission data and the second transmission data, so as to obtain the first transmission data and the second transmission data.

In another aspect, an embodiment of the present invention further provides a terminal device, including:

a second receiving module, configured to receive data for first antenna and data for second antenna that are transmitted by a mobile terminal, where the data for first antenna comprises first transmission data that needs to be transmitted by the mobile terminal to a first device, transmission data that needs to be transmitted to the terminal device, and a parameter of a transmission channel from a second antenna of the mobile terminal to the first device, and the data for second antenna comprises second transmission data that needs to be transmitted by the mobile terminal to the first device, the transmission data that needs to be transmitted to the terminal device, and a parameter of a transmission channel from a first antenna to the first device; and a second obtaining module, configured to obtain, according to the received data for first antenna, the received data for second antenna, a preset parameter of a transmission channel from the mobile terminal to the terminal device, and a preset parameter of a transmission channel from the mobile terminal to the terminal device, the transmission data that needs to be transmitted by the mobile terminal to the terminal device.

The embodiments of the present invention bring the following benefits: In the embodiments of the present invention, a mobile terminal can combine data directed to other two terminals and transmit the combination of data. Because the combination of data includes a parameter of a transmission channel from the mobile terminal to one of the two terminals, the terminal that receives the combination of data can perform proper processing to cancel interference caused by the data transmitted to the other terminal, to the data transmitted to the terminal, thereby enhancing system capacity and spectrum efficiency.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The embodiments of the present invention disclose a new signal transmitting and receiving method. D2D transmission data is superposed on cellular transmission spectrum resources, or data transmitted to two base stations is superposed, or data transmitted through D2D to two terminals is superposed and transmitted over the same time-frequency resources, so that the data transmitted to different terminals does not need to occupy different time-frequency resources. Meanwhile, by constructing a transmission data matrix, interference between different data transmitted to two terminals, which is caused by data superposition, is cancelled, and system capacity and spectrum efficiency are enhanced. The following describes the embodiments of the present invention from perspectives of a data transmitter and a data receiver respectively.

Figure 1:
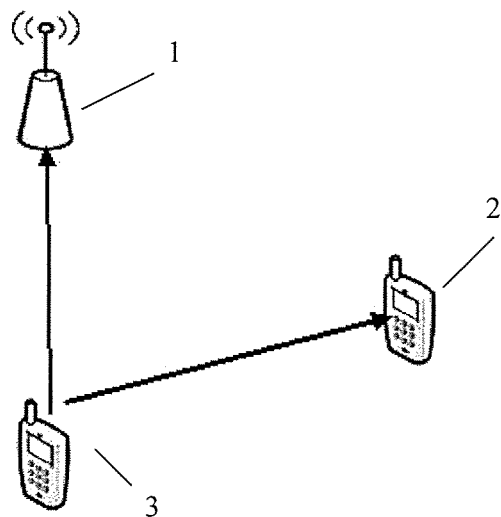
FIG. 1 is a specific schematic structural diagram of a communication system according to an embodiment of the present invention.

FIG. 1 shows a communication system in an embodiment of the present invention. The communication system includes a mobile terminal 3, a first device 1, and a second device 2. Communication between the mobile terminal and the first device is cellular communication or D2D communication, and when the communication is cellular communication, the first device is a base station, or, when the communication is D2D communication, the first device is a D2D terminal device. Communication between the mobile terminal and the second device may also be cellular communication or D2D communication, and when the communication is cellular communication, the second device is a base station, or, when the communication is D2D communication, the second device is a D2D terminal device. The mobile terminal is a signal transmitter, and the first device and the second device are signal receivers. The figure takes a mobile terminal, a base station, and a D2D terminal device as examples. With the architecture, the following describes signal communication of the signal transmitter and the signal receiver.

Figure 2:
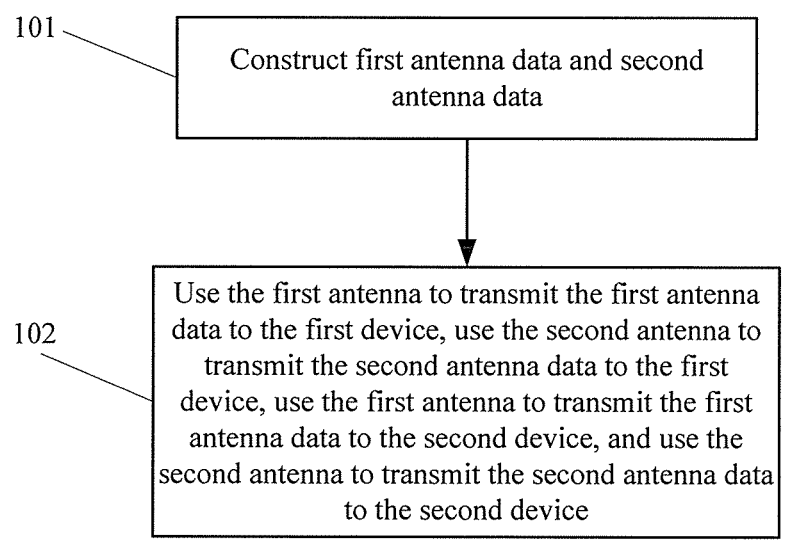
FIG. 2 is a specific schematic flowchart of a signal transmitting method according to an embodiment of the present invention.

FIG. 2 is a specific schematic flowchart of a signal transmitting method according to an embodiment of the present invention. The method is applied in a mobile terminal, where the mobile terminal includes a first antenna and a second antenna and the mobile terminal is communicatively connected to a first device and a second device respectively, and the method specifically includes the following steps:

101. Construct data for first antenna and data for second antenna, where the data for first antenna comprises first transmission data that needs to be transmitted by the first antenna of the mobile terminal to the first device, transmission data that needs to be transmitted by the mobile terminal to the second device, and a parameter of a transmission channel from the second antenna of the mobile terminal to the first device, and the data for second antenna comprises second transmission data that needs to be transmitted by the second antenna of the mobile terminal to the first device, the transmission data that needs to be transmitted by the mobile terminal to the second device, and a parameter of a transmission channel from the first antenna of the mobile terminal to the first device.

For example, when the first device is a base station and the second device is a D2D terminal device, the data for first antenna comprises first cellular uplink transmission data that needs to be transmitted, D2D transmission data that needs to be transmitted, and a parameter of a cellular uplink transmission channel existent when the second antenna performs transmission; the data for second antenna comprises second cellular uplink transmission data that needs to be transmitted, the D2D transmission data that needs to be transmitted, and a parameter of a cellular uplink transmission channel existent when the first antenna performs transmission.

The data for first antenna includes data transmitted by the first antenna over one or more subcarriers, and data transmitted over each subcarrier in the data for first antenna comprises first transmission data that needs to be transmitted over the subcarrier to the first device, transmission data that needs to be transmitted over the subcarrier to the second device, and the parameter of the transmission channel from the second antenna to the first device; and the data for second antenna includes data transmitted by the second antenna over subcarriers, and data transmitted over each subcarrier in the data for second antenna comprises second transmission data that needs to be transmitted over the subcarrier to the first device, transmission data that needs to be transmitted over the subcarrier to the second device, and the parameter of the transmission channel from the first antenna to the first device.

Alternatively, the data for first antenna includes data transmitted by the first antenna over one or more timeslots of a time domain, and data transmitted over each timeslot in the data for first antenna comprises first transmission data that needs to be transmitted over the timeslot to the first device, transmission data that needs to be transmitted over the timeslot to the second device, and the parameter of the transmission channel from the second antenna to the first device; and the data for second antenna includes data transmitted by the second antenna over one or more timeslots of a time domain, and data transmitted over each timeslot in the data for second antenna comprises second transmission data that needs to be transmitted over the timeslot to the first device, transmission data that needs to be transmitted over the timeslot to the second device, and the parameter of the transmission channel from the first antenna to the first device.

It should be noted that: for the data that needs to be transmitted to the second device, at the time of constructing data to be transmitted over the same subcarrier or timeslot, the data that needs to be transmitted to the second device is the same; at the time of constructing data to be transmitted over different subcarriers or timeslots, the data that needs to be transmitted to the second device may be different.

For example, the constructing data for first antenna and data for second antenna includes: generating the data for first antenna $\{c_{2i-1}+h_2 s_i\}_{i=1}^{m}$ according to $c_{2i-1}+h_2 s_i$ and generating the data for second antenna $\{c_{2i}-h_1 s_i\}_{i=1}^{m}$ according to $c_{2i}-h_1 s_i$, where, $c_{2i-1}$ represents first transmission data that needs to be transmitted over an $i^{th}$ subcarrier or timeslot to the first device, $c_{2i}$ represents second transmission data that needs to be transmitted over the $i^{th}$ subcarrier or timeslot to the first device, $s_i$ represents transmission data that needs to be transmitted over the $i^{th}$ subcarrier or timeslot to the second device, $h_1$ represents the parameter of the transmission channel from the first antenna to the first device, $h_2$ represents the parameter of the transmission channel from the second antenna to the first device, m represents the total number of subcarriers or timeslots for transmitting signals, and m is a natural number.

Definitely, if the terminal device includes more transmitting antennas, antenna data may be constructed correspondingly, that is, the mobile terminal further includes a $k^{th}$ antenna and a $(k+1)^{th}$ antenna, where k is a natural number greater than 2, and $k^{th}$ antenna data and $(k+1)^{th}$ antenna data are constructed, where the $k^{th}$ antenna data comprises $k^{th}$ transmission data that needs to be transmitted to the first device, the transmission data that needs to be transmitted to the second device, and a parameter of a transmission channel from the $(k+1)^{th}$ antenna to the first device, and the $(k+1)^{th}$ antenna data comprises $(k+1)^{th}$ transmission data that needs to be transmitted to the first device, the transmission data that needs to be transmitted to the second device, and a parameter of a transmission channel from the $k^{th}$ antenna to the first device.

102. Use the first antenna to transmit the data for first antenna to the first device, and use the second antenna to transmit the data for second antenna to the first device, so that the first device cancels interference caused by the transmission data that needs to be transmitted to the second device in the data for first antenna and the data for second antenna, to the first transmission data and the second transmission data; and use the first antenna to transmit the data for first antenna to the second device, and use the second antenna to transmit the data for second antenna to the second device.

For example, when the first device is a base station and the second device is a D2D terminal device, the first antenna transmits the data for first antenna to the first device and/or the D2D transmission data receiving device respectively, and the second antenna transmits the data for second antenna to the first device and/or the D2D transmission data receiving device respectively, so that the first device cancels, according to the received data for first antenna and data for second antenna, interference caused to the cellular uplink transmission data by the D2D transmission data that needs to be transmitted, so as to obtain the first cellular uplink transmission data and the second cellular uplink transmission data. Further, it is appropriate to transmit data $\{c_{2i-1}+h_2 s_i\}_{i=1}^{m}$ over a $(\{i\}_{i=1}^{m})^{th}$ subcarrier of the first antenna, and transmit data $\{c_{2i}-h_1 s_i\}_{i=1}^{m}$ over a $(\{i\}_{i=1}^{m})^{th}$ subcarrier of the second antenna.

When there are multiple antennas, the following is included: using the $k^{th}$ antenna to transmit the $k^{th}$ antenna data to the first device, and using the $(k+1)^{th}$ antenna to transmit the $(k+1)^{th}$ antenna data to the first device, so that the first device cancels interference caused by the transmission data that needs to be transmitted to the second device in the $k^{th}$ antenna data and the $(k+1)^{th}$ antenna data, to the first transmission data and the second transmission data; and using the $k^{th}$ antenna to transmit the $k^{th}$ antenna data to the second device, and using the $(k+1)^{th}$ antenna to transmit the $(k+1)^{th}$ antenna data to the second device.

In the foregoing embodiment, through the description in step 101, it is understandable that: the data for first antenna includes the parameter of the channel from the second antenna to the receiver, and the data for second antenna includes the parameter of the channel from the first antenna to the receiver; meanwhile, when the data for first antenna is received by the receiver, the impact caused by the channel from the first antenna to the receiver needs to be superposed, and when the data for second antenna is received by the receiver, the impact caused by the channel from the second antenna to the receiver needs to be superposed. Therefore, when the receiver receives a signal, the coefficient of one or more pieces of transmission data in the received data for first antenna and data for second antenna includes the same channel parameter. In this way, the transmission data can be canceled completely in the received data so long as the coefficient of the transmission data is set properly. The specific setting method will be described with examples in subsequent embodiments. However, understandably, other coefficient setting methods may also be applied, which are not described exhaustively herein.

That is, in order to cancel interference between data transmitted to two terminals (such as interference caused by D2D transmission to cellular transmission), the only action to take is to set a relationship between the data for first antenna and the data for second antenna properly, so as to counteract the transmission data that needs to be transmitted to the second device when the first device receives the signal. For example, if the data for first antenna transmitted over a subcarrier is $c1+h2s1$, the data for second antenna is $c2-h1s1$, $c1$ and $c2$ are cellular transmission data, $h1$ and $h2$ are cellular transmission channels of the first antenna and the second antenna, and $s1$ is D2D transmission data, the signal received by the first device over the carrier is:

$$Y1=h1(c1+h2s1)+h2(c2-h1s1)=h1c1+h1h2s1+h2c2-h2h1s1.$$

In this way, the second term counteracts the fourth term in the foregoing formula, and only $h1c1+h2c2$ remains, which counteracts the interference caused by the data transmitted to the second device, to the data transmitted to the first device. Definitely, in specific design, the relationship between the data for first antenna and the data for second antenna may come in other forms, so long as the coefficient of the transmission data that needs to be transmitted to the first device is designed properly in constructing the data for first antenna and the data for second antenna in consideration of the impact caused by the transmission channel from the first antenna to the first device onto the data for first antenna in the transmission process and the impact caused by the transmission channel from the second antenna to the first device onto the data for second antenna in the transmission process.

To construct the transmission data correctly, before the transmission data is constructed, the following may be further included: obtaining parameters $h_1$ and $h_2$ of transmission channels directed to the first device and existent when the first antenna and the second antenna perform transmission. For example, the parameters are obtained through channel measurement.

In the embodiment of the present invention, the value of m may be 1, 2, 3, . . . . That is, the subcarriers) for transmitting the signal may be one subcarrier, two subcarriers, three subcarriers, and so on; or, the timeslot(s) for transmitting the signal may be one timeslot, two timeslots, three timeslots, and so on. Correspondingly, the transmission data may be constructed in the form of a matrix.

Figure 3:
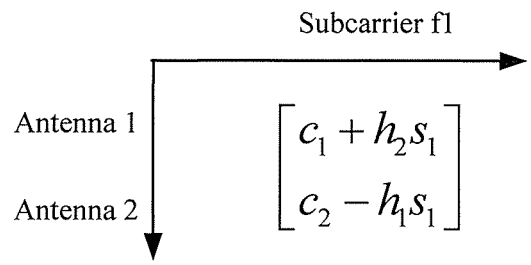
FIG. 3 is a specific schematic diagram of a transmission matrix according to an embodiment of the present invention.

For example, it is assumed that the first device is a base station and that the second device is a D2D terminal device. If m=1, based on the cellular uplink transmission data c1 and c2, the D2D transmission data s1 may be multiplexed, and the matrix of the transmission data is shown in FIG. 3. A column of the matrix represents data transmitted over a carrier, and a row of the matrix represents data transmitted on an antenna. In this example, antenna 1 and antenna 2 transmit data over subcarrier f1 only.

Figure 4:
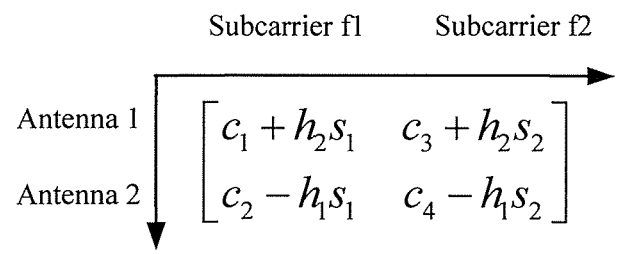
FIG. 4 is another specific schematic diagram of a transmission matrix according to an embodiment of the present invention.

If m=2, based on the cellular uplink transmission data c1, c2, c3, and c4, the D2D transmission data s1 and s2 may be multiplexed, and the matrix of the transmission data is shown in FIG. 4. In this example, antenna 1 and antenna 2 transmit data over subcarriers f1 and f2.

Figure 5:
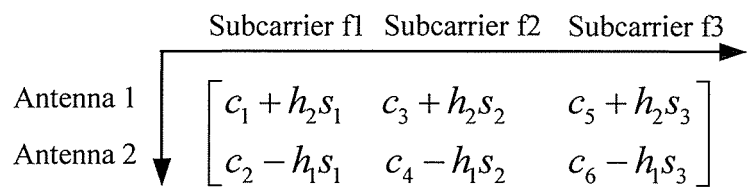
FIG. 5 is a third specific schematic diagram of a transmission matrix according to an embodiment of the present invention.

If m=3, based on the cellular uplink transmission data c1, c2, c3, c4, c5, and c6, the D2D transmission data s1, s2, and s3 may be multiplexed, and the matrix of the transmission data is shown in FIG. 5. In this example, antenna 1 and antenna 2 transmit data over subcarriers f1, f2, and f3.

By analogy, transmission matrices constructed under circumstances of more subcarriers may be obtained. The same applies to the transmission over different timeslots.

In a specific constructed transmission matrix, a signal relationship in the transmission data may be set properly to make it easier for the receiver to decode and obtain required data.

For example, if m=2, when the data for first antenna and the data for second antenna are generated, $c_3=-c_2^*$ and $c_4=c_1^*$ are fulfilled; and accordingly, data is transmitted to the first device and the second device according to the following matrix relationship:

$$\begin{bmatrix} c_1+h_2s_1 & -c_2^*+h_2s_2 \\ c_2-h_1s_1 & c_1^*-h_1s_2 \end{bmatrix}$$

where, a first column of the matrix represents data transmitted over a first subcarrier or timeslot to the first device and the second device, a second column of the matrix represents data transmitted over a second subcarrier or timeslot to the first device and the second device, a first row of the matrix represents data transmitted from the first antenna to the first device and the second device, and a second row of the matrix represents data transmitted from the second antenna to the first device and the second device; a first element in the first column of the matrix represents data transmitted over the first subcarrier or timeslot from the first antenna to the first device and the second device, and a second element in the first column of the matrix represents data transmitted over the first subcarrier or timeslot from the second antenna to the first device and the second device; and a first element in the second column of the matrix represents data transmitted over the second subcarrier or timeslot from the first antenna to the first device and the second device, and a second element in the second column of the matrix represents data transmitted over the second subcarrier or timeslot from the second antenna to the first device and the second device.

Definitely, although the data transmitted to both the first device and the second device is transmitted according to the foregoing data matrix, the data actually received by the first device is different from the data actually received by the second device due to channel difference.

Correspondingly, the signal receiver needs to decode and obtain required signals according to the special relationship of the constructed data.

Figure 6:
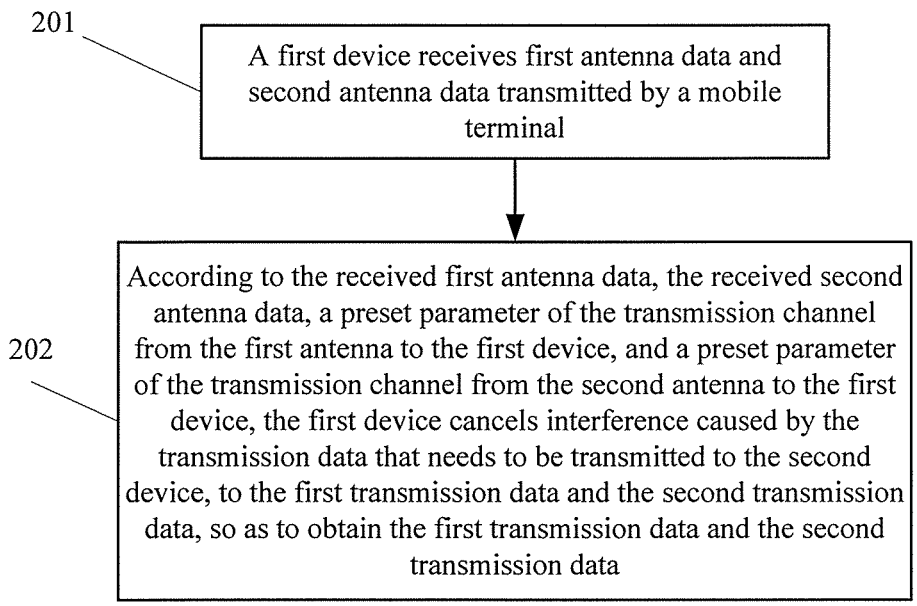
FIG. 6 is a specific schematic flowchart of a signal receiving method according to an embodiment of the present invention.

FIG. 6 is a specific schematic flowchart of a signal receiving method according to an embodiment of the present invention. This method is applicable to the process in which the first device receives signals, which is described in the signal transmitting method above. The method includes the following steps:

201. A first device receives data for first antenna and data for second antenna that are transmitted by a mobile terminal, where the data for first antenna comprises first transmission data that needs to be transmitted by the mobile terminal to a local receiver, transmission data that needs to be transmitted to a second device, and a parameter of a transmission channel from a second antenna of the mobile terminal to the first device, and the data for second antenna comprises second transmission data that needs to be transmitted by the mobile terminal to the first device, the transmission data that needs to be transmitted to the second device, and a parameter of a transmission channel from a first antenna of the mobile terminal to the local receiver.

The data for first antenna and the data for second antenna include data transmitted over one or more subcarriers or data transmitted over one or more timeslots.

Therefore, this step may include: receiving data $y_B$ over a $(\{i\}_{i=1}^m)^{th}$ subcarrier or timeslot, where $$y_B = \{h_1(c_{2i-1} + h_2 s_i) + h_2(c_{2i} - h_1 s_i) + n_i\}_{i=1}^m$$

where, $c_{2i-1}$ and $c_{2i}$ respectively represent first transmission data and second transmission data that need to be transmitted over an $i^{th}$ subcarrier or timeslot to the local receiver, $s_i$ represents transmission data that needs to be transmitted over the $i^{th}$ subcarrier or timeslot to the second device, $h_1$ and $h_2$ respectively represent the parameter of the transmission channel from the first antenna to the local receiver and the parameter of the transmission channel from the second antenna to the local receiver, m represents the total number of subcarriers or timeslots for transmitting signals, and m is a natural number.

Definitely, if the transmitted data includes data of more antennas, the received data includes corresponding data. As known from the description of the signal transmitting method above, so long as the number of pieces of transmitted antenna data is an even number, the impact of the data transmitted to the second device can be counteracted on the receiver.

202. The first device cancels, according to the received data for first antenna, the received data for second antenna, a preset parameter of the transmission channel from the first antenna to the first device, and a preset parameter of the transmission channel from the second antenna to the first device, interference caused by the transmission data that needs to be transmitted to the second device, to the first transmission data and the second transmission data, so as to obtain the first transmission data and the second transmission data.

Like what is described above, in the receiving process, data over m carriers is received, and the data is decoded according to different data over subcarriers or timeslots. The specific number of subcarriers or timeslots may be agreed with the transmitter beforehand.

For example, if m=2 and the received data fulfills $c_3 = -c_2^*$ and $c_4 = c_1^*$, the received data is:

$$y_B = \begin{bmatrix} y_1 \\ y_2 \end{bmatrix} = \begin{bmatrix} h_1(c_1 + h_2 s_1) + h_2(c_2 - h_1 s_1) \\ h_1(-c_2^* + h_2 s_2) + h_2(c_1^* - h_1 s_2) \end{bmatrix} + \begin{bmatrix} n_1 \\ n_2 \end{bmatrix} \quad \text{(formula 1)}$$

where, $y_B$ represents data received over the $(\{i\}_{i=1}^m)^{th}$ subcarrier or timeslot, $s_i$ represents the transmission data that needs to be transmitted over the $i^{th}$ subcarrier or timeslot to the second device, $h_1$ represents the parameter of the transmission channel from the first antenna to the first device, and $h_2$ represents the parameter of the transmission channel from the second antenna to the first device.

Accordingly, this step may include: processing the received $y_B$ to obtain $$y'_B = \begin{bmatrix} y_1 \\ y_2^* \end{bmatrix} = \begin{bmatrix} h_1 & h_2 \\ h_2^* & -h_1^* \end{bmatrix} \begin{bmatrix} c_1 \\ c_2 \end{bmatrix} + \begin{bmatrix} n_1 \\ n_2 \end{bmatrix} \quad \text{(formula 2)}$$

where, $y_2^*$ is a conjugate of $y_2$, $h_2^*$ is a conjugate of $h_2$, $h_1^*$ is a conjugate of $h_1$, $n_2^*$ is a conjugate of $n_2$, $y_1$ is data received over a first subcarrier, and $y_2$ is data received over a second subcarrier; and obtaining $c_1$ and $c_2$ by calculation according to the obtained $y'_B$, the known $h_1$ and $h_2$, and a relationship between $y'_B$ and $(h_1, h_2)$ in the foregoing formula, where $c_1$ represents first transmission data that needs to be transmitted over the first subcarrier to the first device, and $c_2$ represents second transmission data that needs to be transmitted over the second subcarrier to the first device.

That is, as seen from formula 2, interference caused by $s_1$ and $s_2$ to $c_1$ and $c_2$ has been completely cancelled in formula 2, that is, after data $y_B$ is received, the data $y_2$ received over the second carrier in the data $y_B$ can be conjugated to obtain $y'_B$. Afterward, $c_1$ and $c_2$ can be obtained by calculation according to the known $h_1$ and $h_2$ and the relationship in formula 2. For example, formula 2 can be solved by using a space frequency block code (Space frequency Block Code, SFBC). Definitely, in the embodiment of the present invention, the formula may be solved by using other methods such as a space time block code (Space time block code, STBC).

Figure 7:
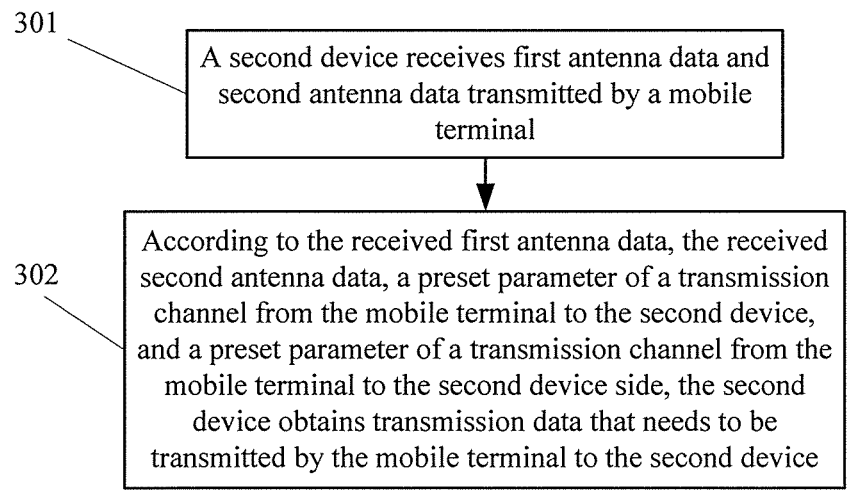
FIG. 7 is another specific schematic flowchart of a signal receiving method according to an embodiment of the present invention.

FIG. 7 is another specific schematic flowchart of a signal receiving method according to an embodiment of the present invention. This method is applied to the process in which the second device receives signals, which is described in the signal transmitting method above. The method includes the following steps:

301. A second device receives data for first antenna and data for second antenna that are transmitted by a mobile terminal, where the data for first antenna comprises first transmission data that needs to be transmitted by the mobile terminal to a first device, transmission data that needs to be transmitted to the second device, and a parameter of a transmission channel from a second antenna of the mobile terminal to the first device, and the data for second antenna comprises second transmission data that needs to be transmitted by the mobile terminal to the first device, the transmission data that needs to be transmitted to the second device, and a parameter of a transmission channel from a first antenna to the first device. It should be noted that, the data for first antenna and the data for second antenna that are actually received by the data receiving device are different from the transmitted data for first antenna and data for second antenna due to the impact caused by the transmission channel.

Definitely, the data for first antenna and the data for second antenna that are transmitted by the mobile terminal to the second device include data transmitted over one or more subcarriers or data transmitted over one or more timeslots.

This step may specifically be: receiving data $y_D$ respectively over a $(\{i\}_{i=1}^m)^{th}$ subcarrier or timeslot of a first receiving antenna and over a $(\{i\}_{i=1}^m)^{th}$ subcarrier or timeslot of a second receiving antenna, where $$y_D = \left\{ \begin{matrix} y_{1i} \\ y_{2i} \end{matrix} \right\}_{i=1}^m = \left\{ \begin{matrix} g_1^i(c_{2i-1} + h_2 s_i) + g_1^i(c_{2i} - h_1 s_i) + n_{2i-1} \\ g_2^i(c_{2i-1} + h_2 s_i) + g_2^i(c_{2i} - h_1 s_i) + n_{2i} \end{matrix} \right\}_{i=1}^m$$

where, $c_{2i-1}$ and $c_{2i}$ respectively represent first transmission data and second transmission data that need to be transmitted over an $i^{th}$ subcarrier or timeslot to the first device, $s_i$ represents transmission data that needs to be transmitted over the $i^{th}$ subcarrier or timeslot to a local side, $h_1$ and $h_2$ respectively represent the parameter of the transmission channel from the first antenna to the first device and the parameter of the transmission channel from the second antenna to the first device, m represents the total number of subcarriers or timeslots for transmitting signals, m is a natural number, $g_j^i$ represents a parameter of a channel between a local $i^{th}$ receiving antenna and a $j^{th}$ transmitting antenna of a data transmitting device, and $n_{2i-1}$ and $n_{2i}$ are noise in received data.

302. The second device obtains, according to the received data for first antenna, the received data for second antenna, a preset parameter of a transmission channel from the mobile terminal to the second device, and a preset parameter of a transmission channel from the mobile terminal to the second device side, the transmission data that needs to be transmitted by the mobile terminal to the second device.

For example, if m=2 and the received data fulfills $c_3 = -c_2^*$ and $c_4 = c_1^*$, the received data is:

$$y_D = \begin{bmatrix} y_{11} \\ y_{12} \\ y_{21} \\ y_{22} \end{bmatrix} = \begin{bmatrix} g_1^1(c_1 + h_2 s_1) + g_2^1(c_2 - h_1 s_1) \\ g_1^1(-c_2^* + h_2 s_2) + g_2^1(c_1^* - h_1 s_2) \\ g_1^2(c_1 + h_2 s_1) + g_2^2(c_2 - h_1 s_1) \\ g_1^2(-c_2^* + h_2 s_2) + g_2^2(c_1^* - h_1 s_2) \end{bmatrix} + \begin{bmatrix} n_1 \\ n_2 \\ n_3 \\ n_4 \end{bmatrix};$$ (formula 3)

and the received data $y_D$ is processed to obtain $y'_D$, where $$y'_D = \begin{bmatrix} y_{11} \\ y_{12}^* \\ y_{21} \\ y_{22}^* \end{bmatrix} =$$ (formula 4)

$$\begin{bmatrix} g_1^1 & g_2^1 & g_1^1 h_2 - g_2^1 h_1 & 0 \\ (g_2^1)^* & -(g_1^1)^* & 0 & -h_1^*(g_2^1)^* + h_2^*(g_1^1)^* \\ g_1^2 & g_2^2 & g_1^2 h_2 - g_2^2 h_1 & 0 \\ (g_2^2)^* & -(g_1^2)^* & 0 & -h_1^*(g_2^2)^* + h_2^*(g_1^2)^* \end{bmatrix}$$

$$\begin{bmatrix} c_1 \\ c_2^* \\ s_1 \\ s_2^* \end{bmatrix} + \begin{bmatrix} n_1 \\ n_2^* \\ n_3 \\ n_4^* \end{bmatrix}$$

where, a symbol * represents a conjugate; and $s_1$ and $s_2$ are obtained by calculation according to the known $h_1$, $h_2$, $g_j^i$ and $y'_D$, and a relationship between ($h_1$, $h_2$, $g_j^i$) and ($s_1$, $s_2$) in $y'_D$.

Formula 4 includes 4 equations and 4 unknown numbers. Therefore, a method such as a minimum mean square error (Minimum Mean Square Error, MMSE) and successive interference cancellation (Successive interference cancellation, SIC) may be used to calculate transmission data $s_1$ and $s_2$ that need to be transmitted to the second device.

Figure 8:
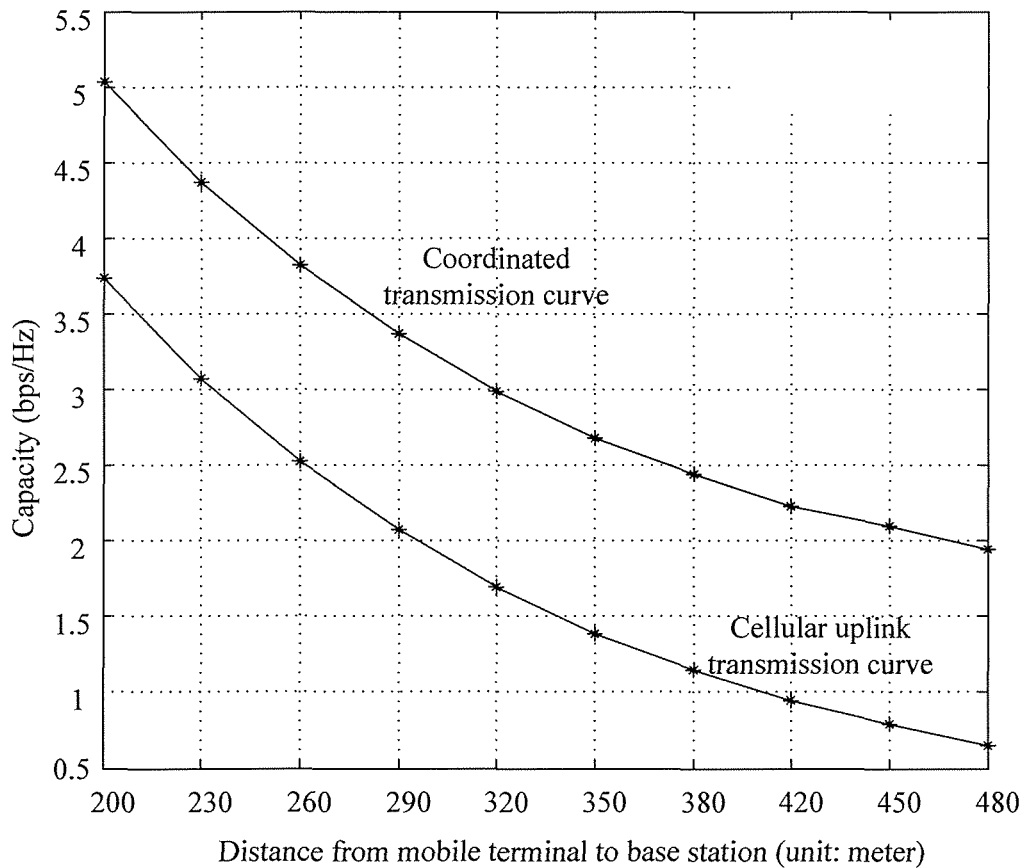
FIG. 8 is a schematic diagram showing an emulation result after emulation using a signal transmitting and receiving method according to an embodiment of the present invention.

The inventor has performed an emulation experiment on the solution disclosed in the embodiment of the present invention. Assuming that the distance of D2D transmission is 10 meters (meters, m), a change of channel capacity is emulated when the distance from a user terminal (User Equipment, UE) to abase station (Base Station, BS) varies from 200 m to 500 m, as shown in FIG. 8. The lower curve in the figure is a channel capacity curve when an existing cellular uplink transmission solution is applied, and the upper curve in the figure is a channel capacity curve when a coordinated transmission solution in the embodiment of the present invention is applied. Evidently, the channel capacity in the solution in the embodiment of the present invention is far higher than the capacity in the existing cellular uplink transmission solution, and is about 50% higher on average.

Figure 9:
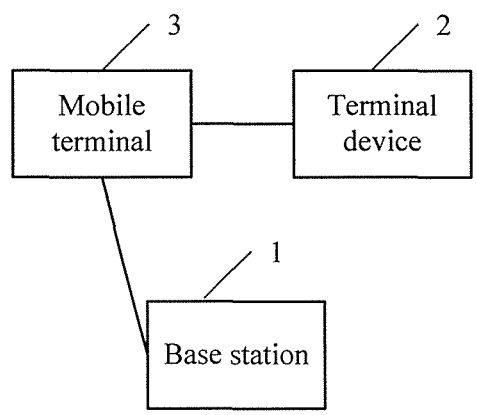
FIG. 9 is a specific schematic structural diagram of a communication system according to an embodiment of the present invention.

Corresponding to the foregoing methods, an embodiment of the present invention further provides a communication system. The system includes a mobile terminal 3, abase station 1, and a terminal device 2 that performs D2D transmission with the mobile terminal, as shown in FIG. 9.

Figure 10:
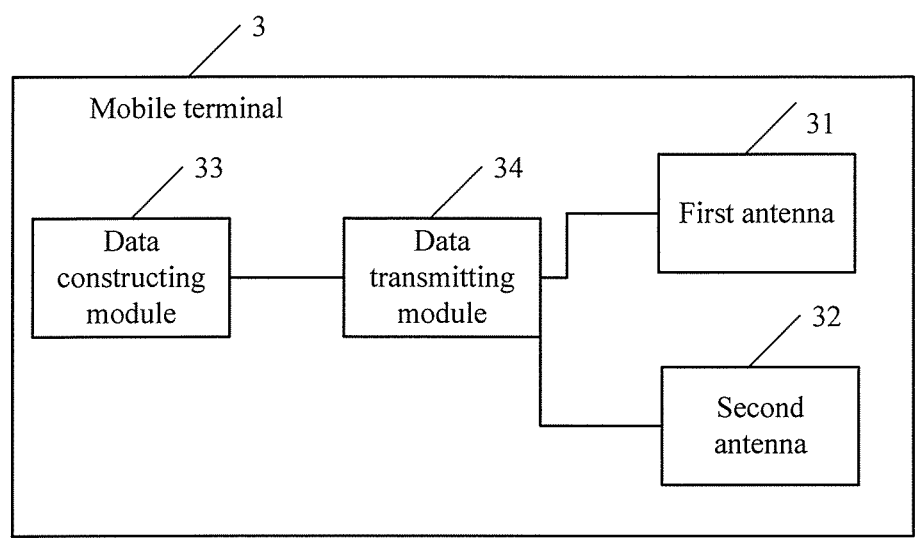
FIG. 10 is a specific schematic structural diagram of a mobile terminal according to an embodiment of the present invention.

As shown in FIG. 10, the mobile terminal 3 includes a first antenna 31, a second antenna 32, and a data constructing module 33, configured to construct data for first antenna and data for second antenna, where the data for first antenna comprises first transmission data that needs to be transmitted by the first antenna of the mobile terminal to the first device, transmission data that needs to be transmitted by the mobile terminal to the second device, and a parameter of a transmission channel from the second antenna of the mobile terminal to the first device, and the data for second antenna comprises second transmission data that needs to be transmitted by the second antenna of the mobile terminal to the first device, the transmission data that needs to be transmitted by the mobile terminal to the second device, and a parameter of a transmission channel from the first antenna of the mobile terminal to the first device; and a data transmitting module 34, connected to the data constructing module 32, the first antenna 31, and the second antenna 32, and configured to: use the first antenna to transmit the data for first antenna to the first device, and use the second antenna to transmit the data for second antenna to the first device, so that the first device cancels interference caused by the transmission data that needs to be transmitted to the second device in the data for first antenna and the data for second antenna, to the first transmission data and the second transmission data; and use the first antenna to transmit the data for first antenna to the second device, and use the second antenna to transmit the data for second antenna to the second device.

The data for first antenna transmitted by the data transmitting module 34 through the first antenna includes data transmitted by the first antenna over one or more subcarriers, and data transmitted over each subcarrier in the data for first antenna comprises first transmission data that needs to be transmitted over the subcarrier to the first device, transmission data that needs to be transmitted over the subcarrier to the second device, and the parameter of the transmission channel from the second antenna to the first device; and the data for second antenna transmitted by the data transmitting module 34 through the second antenna also includes data transmitted by the second antenna over subcarriers, and data transmitted over each subcarrier in the data for second antenna comprises second transmission data that needs to be transmitted over the subcarrier to the first device, transmission data that needs to be transmitted over the subcarrier to the second device, and the parameter of the transmission channel from the first antenna to the first device.

Alternatively, the data for first antenna transmitted by the data transmitting module 34 through the first antenna includes data transmitted by the first antenna over one or more timeslots of a time domain, and data transmitted over each timeslot in the data for first antenna comprises first transmission data that needs to be transmitted over the timeslot to the first device, transmission data that needs to be transmitted over the timeslot to the second device, and the parameter of the transmission channel from the second antenna to the first device; and the data for second antenna transmitted by the data transmitting module 34 through the second antenna includes data transmitted by the second antenna over one or more timeslots of a time domain, and data transmitted over each timeslot in the data for second antenna comprises second transmission data that needs to be transmitted over the timeslot to the first device, transmission data that needs to be transmitted over the timeslot to the second device, and the parameter of the transmission channel from the first antenna to the first device.

Further, the data constructing module 33 is specifically configured to generate the data for first antenna $\{c_{2i-1}+h_2 s_i\}_{i=1}^m$ according to $c_{2i-1}+h_2 s_i$, and generate the data for second antenna $\{c_{2i}-h_1 s_i\}_{i=1}^m$ according to $c_{2i}-h_1 s_i$, where, $c_{2i-1}$ represents first transmission data that needs to be transmitted over an $i^{th}$ subcarrier or timeslot to the first device, $c_{2i}$ represents second transmission data that needs to be transmitted over the $i^{th}$ subcarrier or timeslot to the first device, $s_i$ represents transmission data that needs to be transmitted over the $i^{th}$ subcarrier or timeslot to the second device, $h_1$ represents the parameter of the transmission channel from the first antenna to the first device, $h_2$ represents the parameter of the transmission channel from the second antenna to the first device, m represents the total number of subcarriers or timeslots for transmitting signals, and m is a natural number.

Figure 11:
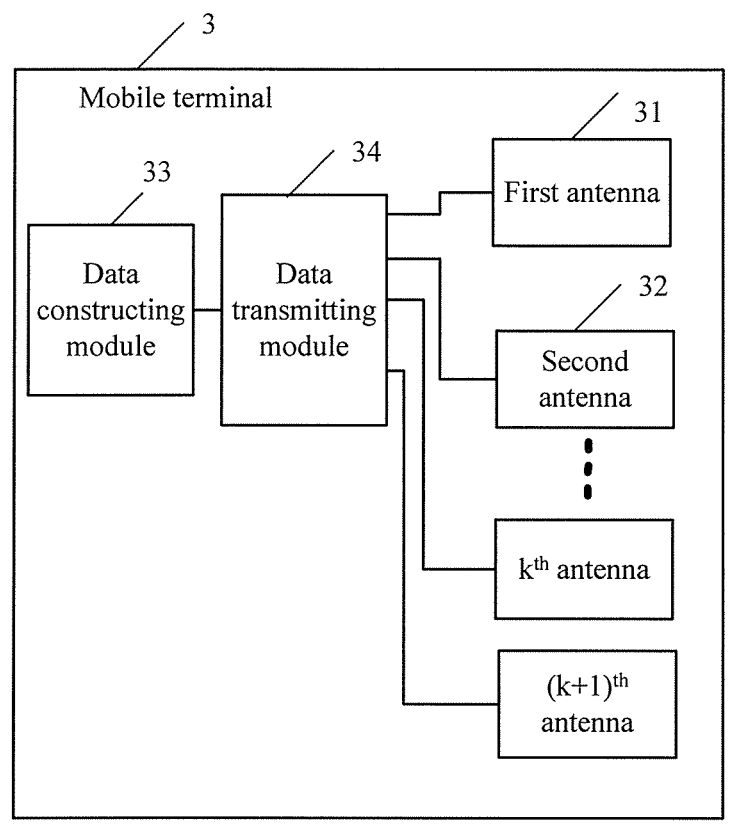
FIG. 11 is another specific schematic structural diagram of a mobile terminal according to an embodiment of the present invention.

As shown in FIG. 11, the mobile terminal 3 may further include a $k^{th}$ antenna and a $(k+1)^{th}$ antenna, where k is a natural number greater than 2. The data constructing module 33 is further configured to construct $k^{th}$ antenna data and $(k+1)^{th}$ antenna data, where the $k^{th}$ antenna data comprises $k^{th}$ transmission data that needs to be transmitted to the first device, the transmission data that needs to be transmitted to the second device, and a parameter of a transmission channel from the $(k+1)^{th}$ antenna to the first device, and the $(k+1)^{th}$ antenna data comprises $(k+1)^{th}$ transmission data that needs to be transmitted to the first device, the transmission data that needs to be transmitted to the second device, and a parameter of a transmission channel from the $k^{th}$ antenna to the first device; and the data transmitting module 34 is further connected to the $k^{th}$ antenna and the $(k+1)^{th}$ antenna, and is further configured to: use the $k^{th}$ antenna to transmit the $k^{th}$ antenna data to the first device, and use the $(k+1)^{th}$ antenna to transmit the $(k+1)^{th}$ antenna data to the first device, so that the first device cancels interference caused by the transmission data that needs to be transmitted to the second device in the $k^{th}$ antenna data and the $(k+1)^{th}$ antenna data, to the first transmission data and the second transmission data; and use the $k^{th}$ antenna to transmit the $k^{th}$ antenna data to the second device, and use the $(k+1)^{th}$ antenna to transmit the $(k+1)^{th}$ antenna data to the second device.

Figure 12:
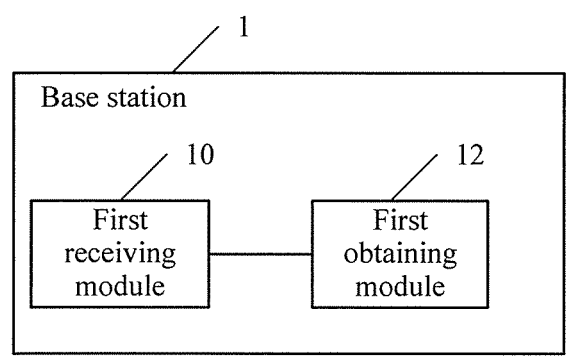
FIG. 12 is a specific schematic structural diagram of a base station according to an embodiment of the present invention.

FIG. 12 is a specific schematic structural diagram of a base station according to an embodiment of the present invention. The base station 1 may include: a first receiving module 10, configured to receive data for first antenna and data for second antenna that are transmitted by a mobile terminal, where the data for first antenna comprises first transmission data that needs to be transmitted by the mobile terminal to the base station, transmission data that needs to be transmitted to a second device, and a parameter of a transmission channel from a second antenna of the mobile terminal to the base station, and the data for second antenna comprises second transmission data that needs to be transmitted by the mobile terminal to the base station, the transmission data that needs to be transmitted to the second device, and a parameter of a transmission channel from a first antenna of the mobile terminal to the base station; and a first obtaining module 12, configured to cancel, according to the received data for first antenna, the received data for second antenna, a preset parameter of the transmission channel from the first antenna to the base station, and a preset parameter of the transmission channel from the second antenna to the base station, interference caused by the transmission data that needs to be transmitted to the second device, to the first transmission data and the second transmission data, so as to obtain the first transmission data and the second transmission data.

The data for first antenna and the data for second antenna include data transmitted over one or more subcarriers or data transmitted over one or more timeslots.

The first receiving module 10 is further configured to receive data $y_B$ over a $(\{i\}_{i=1}^m)^{th}$ subcarrier or timeslot, where)

$$y_B = \{h_1(c_{2i-1}+h_2 s_i)+h_2(c_{2i}-h_1 s_i)+n_i\}_{i=1}^m,$$

where, $c_{2i-1}$ and $c_{2i}$ respectively represent first transmission data and second transmission data that need to be transmitted over an $i^{th}$ subcarrier or timeslot to the base station, $s_i$ represents transmission data that needs to be transmitted over the $i^{th}$ subcarrier or timeslot to the second device, $h_1$ and $h_2$ respectively represent the parameter of the transmission channel from the first antenna to the base station and the parameter of the transmission channel from the second antenna to the base station, m represents the total number of subcarriers or timeslots for transmitting signals, and m is a natural number.

For example, if m=2 and the received data fulfills $c_3=-c_2^*$ and $c_4=c_1^*$, $$y_B = \begin{bmatrix} y_1 \\ y_2 \end{bmatrix} = \begin{bmatrix} h_1(c_1+h_2 s_1)+h_2(c_2-h_1 s_1) \\ h_1(-c_2^*+h_2 s_2)+h_2(c_1^*-h_1 s_2) \end{bmatrix} + \begin{bmatrix} n_1 \\ n_2 \end{bmatrix},$$

where $y_B$ represents data received over the $(\{i\}_{i=1}^m)^{th}$ subcarrier or timeslot, $s_i$ represents the transmission data that needs to be transmitted over the $i^{th}$ subcarrier or timeslot to the second device, $h_1$ represents the parameter of the transmission channel from the first antenna to the base station, and $h_2$ represents the parameter of the transmission channel from the second antenna to the base station; and the first obtaining module 12 is further configured to: process the received $y_B$ to obtain $$y_B' = \begin{bmatrix} y_1 \\ y_2^* \end{bmatrix} = \begin{bmatrix} h_1 & h_2 \\ h_2^* & -h_1^* \end{bmatrix} \begin{bmatrix} c_1 \\ c_2 \end{bmatrix} + \begin{bmatrix} n_1 \\ n_2^* \end{bmatrix}$$

where, $y_2^*$ is a conjugate of $y_2$, $h_2^*$ is a conjugate of $h_2$, $h_1^*$ is a conjugate of $h_1$, $n_2^*$ is a conjugate of $n_2$, $y_1$ is data received over a first subcarrier, and $y_2$ is data received over a second subcarrier; and obtain $c_1$ and $c_2$ by calculation according to the obtained $y'_B$, the known $h_1$ and $h_2$, and a relationship between $y'_B$ and $(h_1, h_2)$ in the foregoing formula, where $c_1$ represents first transmission data that needs to be transmitted over the first subcarrier to the base station, and $c_2$ represents second transmission data that needs to be transmitted over the second subcarrier to the base station.

Figure 13:
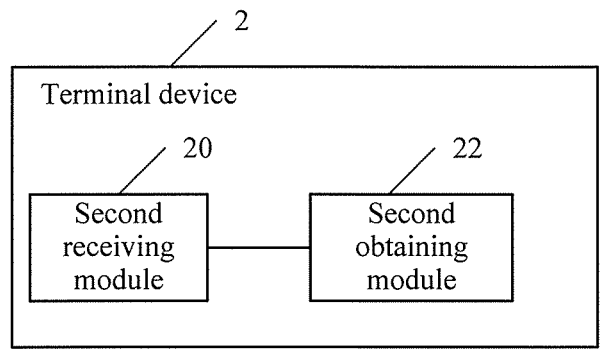
FIG. 13 is a specific schematic structural diagram of a terminal device according to an embodiment of the present invention.

FIG. 13 is a specific schematic structural diagram of a terminal device according to an embodiment of the present invention. The terminal device 2 may include: a second receiving module 20, configured to receive data for first antenna and data for second antenna that are transmitted by a mobile terminal, where the data for first antenna comprises first transmission data that needs to be transmitted by the mobile terminal to a first device, transmission data that needs to be transmitted to the terminal device, and a parameter of a transmission channel from a second antenna of the mobile terminal to the first device, and the data for second antenna comprises second transmission data that needs to be transmitted by the mobile terminal to the first device, the transmission data that needs to be transmitted to the terminal device, and a parameter of a transmission channel from a first antenna to the first device; and a second obtaining module 22, configured to obtain, according to the received data for first antenna, the received data for second antenna, a preset parameter of a transmission channel from the mobile terminal to the terminal device, and a preset parameter of a transmission channel from the mobile terminal to the terminal device, the transmission data that needs to be transmitted by the mobile terminal to the terminal device.

Figure 14:
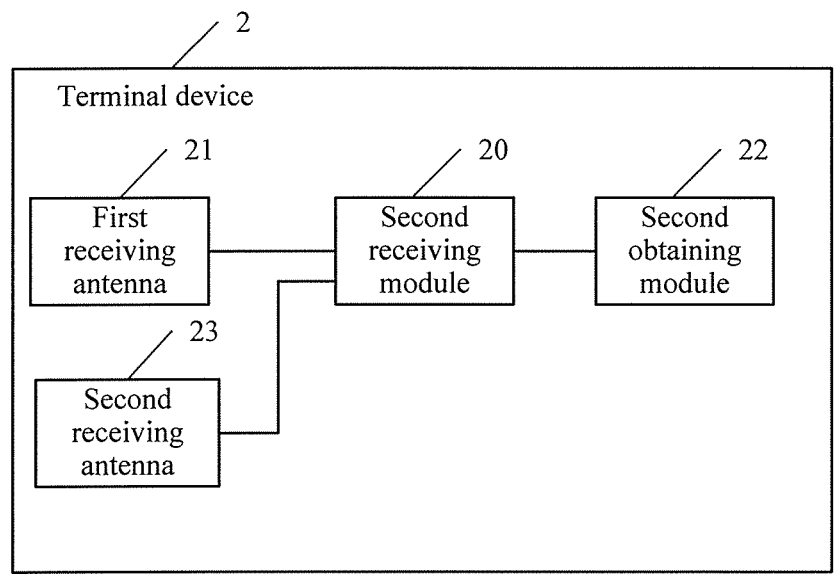
FIG. 14 is another specific schematic structural diagram of a terminal device according to an embodiment of the present invention.

The data for first antenna and the data for second antenna include data transmitted over one or more subcarriers or data transmitted over one or more timeslots, and the terminal device further includes a first receiving antenna 21 and a second receiving antenna 23, as shown in FIG. 14, where the second receiving module 20 is further configured to receive data $y_D$ respectively over a $(\{i\}_{i=1}^m)^{th}$ subcarrier or timeslot of the first receiving antenna and over a $(\{i\}_{i=1}^m)^{th}$ subcarrier or timeslot of the second receiving antenna, where $$y_D = \left\{ \begin{matrix} y_{1i} \\ y_{2i} \end{matrix} \right\}_{i=1}^m = \left\{ \begin{matrix} g_1^i(c_{2i-1} + h_2 s_i) + g_1^i(c_{2i} - h_1 s_i) + n_{2i-1} \\ g_2^i(c_{2i-1} + h_2 s_i) + g_2^i(c_{2i} - h_1 s_i) + n_{2i} \end{matrix} \right\}_{i=1}^m$$

where, $c_{2i-1}$ and $c_{2i}$ respectively represent first transmission data and second transmission data that need to be transmitted over an $i^{th}$ subcarrier or timeslot to the first device, $s_i$ represents transmission data that needs to be transmitted over the $i^{th}$ subcarrier or timeslot to a local side, $h_1$ and $h_2$ respectively represent the parameter of the transmission channel from the first antenna to the first device and the parameter of the transmission channel from the second antenna to the first device, m represents the total number of subcarriers or timeslots for transmitting signals, m is a natural number, $g_j^i$ represents a parameter of a channel between a local $i^{th}$ receiving antenna and a $j^{th}$ transmitting antenna of a data transmitting device, and $n_{2i-1}$ and $n_{2i}$ are noise in received data.

For example, if m=2 and the received data fulfills $c_3=-c_2^*$ and $c_4=c_1^*$, $$y_D = \begin{bmatrix} y_{11} \\ y_{12} \\ y_{21} \\ y_{22} \end{bmatrix} = \begin{bmatrix} g_1^1(c_1 + h_2 s_1) + g_2^1(c_2 - h_1 s_1) \\ g_1^1(-c_2^* + h_2 s_2) + g_2^1(c_1^* - h_1 s_2) \\ g_1^2(c_1 + h_2 s_1) + g_2^2(c_2 - h_1 s_1) \\ g_1^2(-c_2^* + h_2 s_2) + g_2^2(c_1^* - h_1 s_2) \end{bmatrix} + \begin{bmatrix} n_1 \\ n_2 \\ n_3 \\ n_4 \end{bmatrix};$$

and the second obtaining module 22 is further configured to: process $y_D$ to obtain $y'_D$, where $$y'_D = \begin{bmatrix} y_{11} \\ y_{12}^* \\ y_{21} \\ y_{22}^* \end{bmatrix} =$$

$$\begin{bmatrix} g_1^1 & g_2^1 & g_1^1 h_2 - g_2^1 h_1 & 0 \\ (g_2^1)^* & -(g_1^1)^* & 0 & -h_1^*(g_2^1)^* + h_2^*(g_1^1)^* \\ g_1^2 & g_2^2 & g_1^2 h_2 - g_2^2 h_1 & 0 \\ (g_2^2)^* & -(g_1^2)^* & 0 & -h_1^*(g_2^2)^* + h_2^*(g_1^2)^* \end{bmatrix} \begin{bmatrix} c_1 \\ c_2^* \\ s_1 \\ s_2^* \end{bmatrix} + \begin{bmatrix} n_1 \\ n_2^* \\ n_3 \\ n_4^* \end{bmatrix},$$

where a symbol * represents a conjugate; and obtain $s_1$ and $s_2$ by calculation according to the known $h_1$, $h_2$, $g_j^i$, and $y'_D$, and a relationship between $(h_1, h_2, g_j^i)$ and $(s_1, s_2)$ in $y'_D$.

It should be noted that the terms and specific functions in the foregoing apparatus embodiments are the same as those in the method embodiments, and are not described herein again.

As known from the description of the foregoing embodiments, in the present invention, data transmitted to two terminals is constructed together (for example, D2D transmission data is superposed on cellular transmission spectrum resources, or data transmitted to two base stations or two D2D devices is superposed), and transmitted over the same time-frequency resources, so that the data transmitted to different terminals does not need to occupy different time-frequency resources. Meanwhile, by constructing a transmission data matrix, interference between different data transmitted to two terminals (for example, interference caused by D2D transmission to cellular transmission, or interference between data transmitted to two base stations or between data transmitted to two D2D devices), which is caused by data superposition, is cancelled, and system capacity and spectrum efficiency are enhanced.

A person of ordinary skill in the art may understand that all or a part of the processes of the methods in the embodiments may be implemented by a computer program instructing relevant hardware. The aforementioned program may be stored in a computer readable storage medium. When the program runs, the processes of the foregoing methods in the embodiments are performed. The storage medium may be a magnetic disk, an optical disk, a read-only memory (Read-Only Memory, ROM), or a random access memory (Random Access, RAM).

The foregoing disclosure is merely exemplary embodiments of the present invention, but is not intended to limit the scope of the present invention. Any equivalent variation made according to the claims of the present invention shall fall within the scope of the present invention.

What is claimed is:

1. A signal transmitting method, performed by a mobile terminal comprising a first antenna and a second antenna, the method comprising:
obtaining, through channel measurement, a first parameter of a transmission channel from the first antenna to the first device and a second parameter of a transmission channel from the second antenna to the first device;
constructing first antenna data, including:
first transmission data to be transmitted by the first antenna to a first device;
second device data to be transmitted by the mobile terminal to a second device; and
the second parameter;
constructing second antenna data, including:
second transmission data to be transmitted by the second antenna to the first device;
the second device data; and
the first parameter;
transmitting the first antenna data using the first antenna, and transmitting the second antenna data using the second antenna.

2. The method according to claim 1, wherein:
the first antenna data is transmitted by the first antenna over one or more subcarriers; and
the second antenna data is transmitted by the second antenna over the one or more subcarriers.

3. The method according to claim 1, wherein:
the first antenna data is transmitted by the first antenna over one or more timeslots; and
the second antenna data is transmitted by the second antenna over the one or more timeslots.

4. The method according to claim 2, wherein constructing the first antenna data and constructing the second antenna data comprises:
generating the first antenna data $\{c_{2i-1}+h_2 s_i\}_{i=1}^{m}$ according to $c_{2i-1}+h_2 s_i$, and generating the second antenna data $\{c_{2i}-h_1 s_i\}_{i=1}^{m}$ according to $c_{2i}-h_1 s_i$;
wherein represents first transmission data to be transmitted over an $i^{th}$ subcarrier to the first device, $c_{2i-1}$ represents second transmission data to be transmitted over the $i^{th}$ subcarrier to the first device, $s_i$ represents second device data to be transmitted over the $i^{th}$ subcarrier to the second device, $h_1$ represents the first parameter, $h_2$ represents the second parameter, m represents the total number of subcarriers for transmitting signals, and m is a natural number.

5. The signal transmitting method according to claim 4, wherein:
if m=2, when the first antenna data and the second antenna data are generated, $c_3=-c_2^*$ and $c_4=c_1^*$ are fulfilled;
with transmitting the first antenna data using the first antenna, and transmitting the second antenna data using the second antenna further comprising:
transmitting the first antenna data and the second antenna data according to the following matrix relationship:

$$\begin{bmatrix} c_1 + h_2 s_1 & -c_2^* + h_2 s_2 \\ c_2 - h_1 s_1 & c_1^* - h_1 s_2 \end{bmatrix};$$

wherein a first column of the matrix represents data transmitted over a first subcarrier to the first device and the second device, a second column of the matrix represents data transmitted over a second subcarrier to the first device and the second device, a first row of the matrix represents data transmitted from the first antenna to the first device and the second device, and a second row of the matrix represents data transmitted from the second antenna to the first device and the second device,
wherein a first element in the first column of the matrix represents data transmitted over the first subcarrier from the first antenna to the first device and the second device, and a second element in the first column of the matrix represents data transmitted over the first subcarrier from the second antenna to the first device and the second device, and
wherein a first element in the second column of the matrix represents data transmitted over the second subcarrier from the first antenna to the first device and the second device, and a second element in the second column of the matrix represents data transmitted over the second subcarrier from the second antenna to the first device and the second device.

6. The method according to claim 1, wherein:
the mobile terminal further comprises a $k^{th}$ antenna and a $(k+1)^{th}$ antenna, wherein k is a natural number greater than 2; and
the method further comprises:
constructing $k^{th}$ antenna data, wherein the $k^{th}$ antenna data comprises $k^{th}$ transmission data to be transmitted to the first device, the second device data, and a $(k+1)^{th}$ parameter of a transmission channel from the $(k+1)^{th}$ antenna to the first device;
constructing $(k+1)^{th}$ antenna data, wherein the $(k+1)^{th}$ antenna data comprises $(k+1)^{th}$ transmission data to be transmitted to the first device, the second device data, and a $k^{th}$ parameter of a transmission channel from the $k^{th}$ antenna to the first device; and
transmitting the $k^{th}$ antenna data using the $k^{th}$ antenna and transmitting the $(k+1)^{th}$ antenna data using the $(k+1)^{th}$ antenna.

7. The method according to claim 1, wherein the mobile terminal and the second device are engaged in device-to-device (D2D) communications.

8. The method according to claim 1, wherein the first transmission data and the second transmission data are data to be transmitted to the first device.

9. A signal receiving method, comprising:
receiving, by a first device, first antenna data and second antenna data that are transmitted by a mobile terminal;
the first antenna data comprises first transmission data to be transmitted by the mobile terminal to a local receiver, second device data to be transmitted to a second device, and a second parameter of a transmission channel from a second antenna of the mobile terminal to the first device; and
the second antenna data comprises second transmission data to be transmitted by the mobile terminal to the first device, the second device data, and a first parameter of a transmission channel from a first antenna of the mobile terminal to the first device;
canceling, by the first device, interference in the first transmission data and the second transmission data using the received first antenna data and the received second antenna data, with the interference being caused by the second device data; and
obtaining the first transmission data and the second transmission data.

10. The method according to claim 9, wherein:
the first antenna data and the second antenna data are transmitted over one or more subcarriers or over one or more timeslots; and
receiving first antenna data and second antenna data comprises:
receiving data $y_B$ over a $(\{i\}_{i=1}^m)^{th}$ subcarrier or timeslot, with $$y_B = \{h_1(c_{2i-1}+h_2 s_i)+h_2(c_{2i}-h_1 s_i)+n_i\}_{i=1}^m;$$

wherein $c_{2i-1}$ and $c_{2i}$ respectively represent first transmission data and second transmission data to be transmitted over an $i^{th}$ subcarrier or timeslot to the local receiver, $s_i$ represents second device data that needs to be transmitted over the $i^{th}$ subcarrier or timeslot to the second device, $h_1$ represents the first parameter $h_2$ represents the second parameter, m represents the total number of subcarriers or timeslots for transmitting signals, and m is a natural number.

11. The method according to claim 10, wherein:
if m=2 and the received data fulfills $c_3=-c_2^*$ and $c_4=c_1^*$, $$y_B = \begin{bmatrix} y_1 \\ y_2 \end{bmatrix} = \begin{bmatrix} h_1(c_1+h_2 s_1)+h_2(c_2-h_1 s_1) \\ h_1(-c_2^*+h_2 s_2)+h_2(c_1^*-h_1 s_2) \end{bmatrix} + \begin{bmatrix} n_1 \\ n_2 \end{bmatrix},$$

wherein $y_B$ represents data received over the $(\{i\}_{i=1}^m)^{th}$ subcarrier or timeslot, $s_i$ represents the second device data to be transmitted over the $i^{th}$ subcarrier or timeslot to the second device, $h_1$ represents the first parameter, and $h_2$ represents the second parameter; and
obtaining, by the receiver, the first transmission data and the second transmission data according to the received first antenna data, the received second antenna data comprises:
processing the received $y_B$ to obtain:

$$y_B' = \begin{bmatrix} y_1 \\ y_2^* \end{bmatrix} = \begin{bmatrix} h_1 & h_2 \\ h_2^* & -h_1^* \end{bmatrix}\begin{bmatrix} c_1 \\ c_2 \end{bmatrix} + \begin{bmatrix} n_1 \\ n_2^* \end{bmatrix};$$

wherein $y_2^*$ is a conjugate of $y_2$, $h_2^*$ is a conjugate of $h_2$, $h_1^*$ is a conjugate of $h_1$, $n_2^*$ is a conjugate of $n_2$, $y_1$ is data received over a first subcarrier, and $y_2$ is data received over a second subcarrier; and
obtaining $c_1$ and $c_2$ by calculation according to the obtained $y_B'$ the known $h_1$ and $h_2$, and a relationship between $y_B'$ and ($h_1$, $h_2$) in the foregoing formula, wherein $c_1$ represents first transmission data to be transmitted over the first subcarrier to the first device, and $c_2$ represents second transmission data to be transmitted over the second subcarrier to the first device.

12. The method according to claim 9, wherein the first transmission data and the second transmission data are data to be transmitted to the first device.

13. A mobile terminal, comprising:
a first antenna;
a second antenna; and
a processor coupled to the first antenna and the second antenna, wherein:
the processor is configured to obtain, through channel measurement, a first parameter of a transmission channel from the first antenna to the first device and a second parameter of a transmission channel from the second antenna to the first device, and construct first antenna data and second antenna data,
the first antenna data comprises first transmission data to be transmitted by the first antenna to the a first device, second device data to be transmitted by the mobile terminal to a second device, and a second parameter of a transmission channel from the second antenna to the first device;
the second antenna data comprises second transmission data to be transmitted by the second antenna to the first device, the second device data, and a first parameter of a transmission channel from the first antenna to the first device;
the first antenna is configured to transmit the first antenna data; and
the second antenna is configured to transmit the second antenna data.

14. The mobile terminal according to claim 13, wherein:
the first antenna data is transmitted by the first antenna over one or more subcarriers; and
the second antenna data is transmitted by the second antenna over the one or more subcarriers.

15. The mobile terminal according to claim 13, wherein:
the first antenna data is transmitted by the first antenna over one or more timeslots; and
the second antenna data is transmitted by the second antenna over the one or more timeslots.

16. The mobile terminal according to claim 14, wherein the module processor is configured to generate the first antenna data $\{c_{2i-1}+h_2 s_i\}_{i=1}^m$ according to $c_{2i-1}+h_2 s_i$, and generate the second antenna data $\{c_{2i}-h_1 s_i\}_{i=1}^m$ according to $c_{2i}-h_1 s_i$;
wherein $c_{2i-1}$ represents first transmission data to be transmitted over an $i^{th}$ subcarrier to the first device, $c_{2i}$ represents second transmission data to be transmitted over the $i^{th}$ subcarrier to the first device, $s_i$ represents second transmission data to be transmitted over the $i^{th}$ subcarrier to the second device, $h_1$ represents the first parameter, $h_2$ represents the second parameter, m represents the total number of subcarriers for transmitting signals, and m is a natural number.

17. A base station, comprising:
a receiver, configured to receive first antenna data and second antenna data that are transmitted by a mobile terminal, wherein the first antenna data comprises first transmission data to be transmitted by the mobile terminal to the base station, second device data to be transmitted to a second device, and a second parameter of a transmission channel from a second antenna of the mobile terminal to the first device, and the second antenna data comprises second transmission data to be transmitted by the mobile terminal to the base station, the second device data, and a first parameter of a transmission channel from a first antenna of the mobile terminal to the first device; and
a processor coupled to the receiver, configured to cancel interference in the first transmission data and the second transmission data using the received first antenna and the received second antenna data, with the interference being caused by the second device data, and obtain the first transmission data and the second transmission data.

18. The base station according to claim 17, wherein:
the first antenna data and the second antenna data are transmitted over one or more subcarriers or over one or more timeslots; and the receiver is further configured to receive data $y_B$ over a $(\{i\}_{i=1}^m)^{th}$ subcarrier or timeslot, with $$y_B = \{h_1(c_{2i-1}+h_2s_i)+h_2(c_{2i}-h_1s_i)+n_i\}_{i=1}^m;$$

wherein $c_{2i-1}$ and $c_{2i}$ respectively represent first transmission data and second transmission data that need to be transmitted over an $i^{th}$ subcarrier or timeslot to the base station, $s_i$ represents second device data to be transmitted over the $i^{th}$ subcarrier or timeslot to the second device, $h_1$ represents the first parameter, $h_2$ represents the second parameter, m represents the total number of subcarriers or timeslots for transmitting signals, and m is a natural number.

19. The base station according to claim 18, wherein:
if m=2 and the received data fulfills $c_3 = -c_2^*$ and $c_4 = c_1^*$, $$y_B = \begin{bmatrix} y_1 \\ y_2 \end{bmatrix} = \begin{bmatrix} h_1(c_1+h_2s_1)+h_2(c_2-h_1s_1) \\ h_1(-c_2^*+h_2s_2)+h_2(c_1^*-h_1s_2) \end{bmatrix} + \begin{bmatrix} n_1 \\ n_2 \end{bmatrix},$$

wherein $y_B$ represents data received over the $(\{i\}_{i=1}^m)^{th}$ subcarrier or timeslot, $s_i$ represents the second device data to be transmitted over the $i^{th}$ subcarrier or timeslot to the second device, $h_1$ represents the first parameter, and $h_2$ represents the second parameter; and the processor is further configured to:
process the received $y_B$ to obtain:

$$y_B' = \begin{bmatrix} y_1 \\ y_2^* \end{bmatrix} = \begin{bmatrix} h_1 & h_2 \\ h_2^* & -h_1^* \end{bmatrix} \begin{bmatrix} c_1 \\ c_2 \end{bmatrix} + \begin{bmatrix} n_1 \\ n_2^* \end{bmatrix};$$

wherein $y_2^*$ is a conjugate of $y_2$, $h_2^*$ is a conjugate of $h_2$, $h_1^*$ is a conjugate of $h_1$, $n_2^*$ is a conjugate of $n_2$, $y_1$ is data received over a first subcarrier, and $y_2$ is data received over a second subcarrier; and obtain $c_1$ and $c_2$ by calculation according to the obtained $y_B^*$, the known $h_1$ and $h_2$, and a relationship between $y_B^*$ and $(h_1, h_2)$ in the foregoing formula, wherein $c_1$ represents first transmission data to be transmitted over the first subcarrier to the base station, and $c_2$ represents second transmission data to be transmitted over the second subcarrier to the base station.

* * * * *